UNITED STATES PATENT OFFICE.

CHARLES B. MILLS, OF BALTIMORE, MARYLAND.

ELECTROPLATING PROCESS.

1,144,226.     Specification of Letters Patent.     Patented June 22, 1915.

No Drawing.     Application filed March 16, 1915. Serial No. 14,809.

*To all whom it may concern:*

Be it known that I, CHARLES B. MILLS, a subject of the King of Great Britain, residing in the city of Baltimore and State of Maryland, have invented new and useful Improvements in Electroplating Processes, of which the following is a specification.

My invention relates to a process of electroplating cement, plaster of Paris, stone, wood, and other non-metallic substances, and particularly to a process of treatment whereby such substances are rendered both moisture and acid proof and properly prepared for electrodeposition.

The object of the invention is to provide a process by means of which non-metallic substances of the character described may be electroplated without liability of subsequent disintegration of the plated substance from the action of moisture or acids.

A further object of the invention is to provide a process whereby a metallic coating of great strength, durability and tenacity may be produced upon the article.

A still further object of the invention is to provide a process whereby plastic materials to be coated may be hardened as well as rendered moisture and acid proof, and whereby the deposition of a uniform metallic coating is insured.

In carrying the invention into practice, the article which is to be electroplated is first baked in an oven for a sufficient length of time to expel all moisture. When the article is made of cement, plaster of Paris or other plastic material, a suitable amount of an adhesive, such as glue or gum arabic, may be added to the water with which the material is mixed to form the plastic mass, in order to more firmly bind the particles of the material together. The baked article is then boiled in a liquid acid and water proofing composition composed of asphaltum, methylated spirits, stearic acid and pure glycerin, the ingredients being combined in the proportions, by volume, of one part of asphaltum to two parts of methylated spirits and ten parts of stearic acid, to each gallon of the mixture of which is added six ounces of the glycerin. The above named ingredients are heated in a vessel to the boiling point of the mixture, from 160° to 180° Fahr., and the article to be treated is immersed in this mixture and allowed to remain for a period of one hour or sufficient time for the mixture to thoroughly penetrate all pores and grains of the article and come in contact with every particle thereof. By this mode of treatment the article is rendered both moisture and acid proof, and if it be of plaster of Paris or other plastic material of like nature is also hardened by the action of this bath and rendered of materially greater strength and durability. After the article has been removed from the above mixture and has been allowed to cool in a temperature of about 80° Fahr., it is then coated with a weak solution of sizing, which is made by dissolving one pound of gum arabic in five gallons of hot water. When the gum arabic is thoroughly dissolved, the article is then immersed in this solution and allowed to thoroughly dry by exposure to the air. This sizing prepares the article for the addition of an external coating of water proofing material which also serves as a ground layer for a conducting substance. This external coating is composed of one part, by volume, of litharge to one part of asphaltum and three parts of methylated spirits, to which is added copal gum in the proportion of three ounces to each gallon of a mixture of the aforesaid ingredients. This composition is applied cold either by means of a brush or by dipping the article therein and is allowed to dry until it is still slightly tacky to the touch, when the article is ready for final treatment preparatory to the electrodeposition. This ground layer is held intact and prevented from peeling or breaking off by the sizing coat applied as before stated. When the ground coating has dried to the degree mentioned, the article is brushed or dusted over with dry powdered copper or other suitable metallic conducting substance and then set aside until it has thoroughly dried, when it is again coated with a mixture of powdered copper and alcohol which is applied with a camel's-hair brush or otherwise so that all voids or surfaces not covered by the metallic powder on the first application will be filled or covered up. The article is then placed in the electroplating bath and plated in the usual way.

As a result of the method of treating and preparing the article as above specified, the article is rendered both moisture and acid proof, preparatory to being finished by the application of the conducting coating, so that it can not take up and become affected by moisture or the acid commonly employed in the electroplating process, and hence will not be subject to disintegration from any of the actions due to the presence of moisture or acids. As no acid will be absorbed and retained by the article, it will also be evident that there will be none present to subsequently injure or destroy the deposited metal. Furthermore, the ground coating prepared and applied as described provides for the deposition of a layer of metal which will cling tenaciously to the surface of the article, so that a plated article of great strength and durability will be produced. The body of the article, if made of plaster of Paris or other plastic material, will also be toughened and hardened by the first or proofing solution, thus further insuring strength and durability. The process is therefore one of great value in electroplating non-metallic substances which are liable to be affected by moisture or acids, and whereby electroplated statuary and ornaments and surfaces of great durability may be produced upon various kinds of articles having materials of the kind mentioned as a body or base.

I claim:—

1. The herein described process of electroplating non-metallic substances, which consists in first applying a moisture and acid proof filling and coating, then applying a sizing coating, then applying an adhesive ground coating, then applying a powdered conducting material, and finally electroplating the surface thus prepared.

2. The herein described process of electroplating non-metallic substances, which consists in first applying a moisture and acid proof filling and coating solution of asphaltum, methylated spirits, stearic acid and glycerin, then applying a sizing coating, then applying an adhesive ground coating, then applying a powdered conducting material, and finally electroplating the surface thus prepared.

3. The herein described process of electroplating non-metallic substances, which consists in first applying a moisture and acid proof filling and coating, then applying a sizing coating, then applying an adhesive ground coating composed of a mixture of litharge, asphaltum, methylated spirits and a suitable gum resin, then applying a powdered conducting material, and finally electroplating the surface thus prepared.

4. The herein described process of electroplating non-metallic substances, which consists in first applying a moisture and acid proof filling and coating solution of asphaltum, methylated spirits, stearic acid and glycerin, then applying a sizing coating, then applying an adhesive ground coating, then applying to said ground coating a first coating of a dry powdered conducting substance, then applying a second coating of the conducting substance mixed with a volatile liquid, and finally electroplating the surface thus prepared.

5. The herein described process of electroplating non-metallic substances, which consists in first treating the article with a moisture and acid proof filling and coating solution of asphaltum, methylated spirits, stearic acid and glycerin, then applying a sizing coating, then applying an adhesive ground coating of litharge, asphaltum, methylated spirits and a suitable gum resin, then applying a powdered conducting material, and finally electroplating the surface thus prepared.

6. The herein described process of electroplating non-metallic substances, which consists in first applying a moisture of acid proof filling and coating, then applying a sizing coating, then applying an adhesive ground coating, then applying to said ground coating a first coating of a dry powder conducting substance, then applying a second coating of the conducting substance mixed with a volatile liquid, and finally electroplating the surface thus prepared.

In testimony whereof I affix my signature in presence of two witnesses.

CHARLES B. MILLS.

Witnesses:
JAMES A. KOEHL,
BENNETT S. JONES.